(12) United States Patent
Wang

(10) Patent No.: US 7,466,543 B2
(45) Date of Patent: Dec. 16, 2008

(54) SLOT ASSEMBLY OF HARD DISK TOWER

(75) Inventor: Ah-Jee Wang, Taipei (TW)

(73) Assignee: D-Link Corporation, Taipei (TW)

( * ) Notice: Subject to any disclaimer, the term of this patent is extended or adjusted under 35 U.S.C. 154(b) by 92 days.

(21) Appl. No.: 11/723,766

(22) Filed: Mar. 22, 2007

(65) Prior Publication Data

US 2008/0273300 A1 Nov. 6, 2008

(51) Int. Cl.
*G06F 1/16* (2006.01)
(52) U.S. Cl. .................. 361/685; 348/14.02; 360/97.01; 455/550.1
(58) Field of Classification Search .............. 348/14.02, 348/231.7; 360/97.01, 264.7; 711/112, 114, 711/115; 345/168, 169; 455/550.1, 558; 710/244, 315
See application file for complete search history.

(56) References Cited

U.S. PATENT DOCUMENTS

| | | | | |
|---|---|---|---|---|
| 5,717,570 A | * | 2/1998 | Kikinis | ........................ 361/685 |
| 6,282,087 B1 | * | 8/2001 | Gibbons et al. | ............. 361/685 |
| 7,190,575 B1 | * | 3/2007 | Baik et al. | ................... 361/685 |
| 2007/0230108 A1 | * | 10/2007 | Chen | .......................... 361/685 |

* cited by examiner

*Primary Examiner*—Hung V Duong
(74) *Attorney, Agent, or Firm*—Bacon & Thomas, PLLC

(57) ABSTRACT

The present invention is to provide a slot assembly of hard disk tower, wherein the slot assembly disposed at one end of the hard disk tower comprises an upper slot assembly cover at the top of the hard disk tower having a plurality of upper directing slots; a lower slot assembly cover at the bottom of the hard disk tower having a plurality of lower directing slots, and a circuit board disposed between said upper and lower slot assembly covers. Each lower directing slot which corresponds to one of the upper directing slots is capable of holding a hard disk tray, such that the space within the hard disk tower will be fully utilized and is capable of holding more hard disk trays because of closely disposing the slot assembly covers at the top and bottom of the hard disk tower.

10 Claims, 4 Drawing Sheets

SLOT ASSEMBLY OF HARD DISK TOWER

FIELD OF THE INVENTION

The invention relates to a slot assembly of hard disk tower, more particular to a slot assembly disposed on one end of a hard disk tower, comprising an upper slot assembly cover disposed at the top of said hard disk tower, a lower slot assembly cover disposed at the bottom of the hard disk tower, therefore a plurality of hard disk trays can be held therebetween.

BACKGROUND OF THE INVENTION

The change of the lives makes the connection of all kinds of information become more and more frequent and complicated. As the amount of data with various forms and content as well as the requirements of users of transmission speed and accuracy of handling the data keep increasing, besides reinforcing the computer hardware and updating the software, to store and manage massive data efficiently has become the major direction of development of all enterprises and related corporations.

Due to its simplicity and stability, the hard disk has been broadly utilized in the computer system as the medium of data storage. However, while a great deal of storage space is required (such as in the cases of a personal computer or a minicomputer), because of the relatively high cost and inconvenience of use, the idea of utilizing one single hard disk with enormous volume has been gradually abandoned, instead, storing different data in multiple hard disks with normal volume has been adopted so as to increase the connection of data and facilitate the data access as well. And it is more and more popular to combine multiple hard disks with normal volume to form a computer disk array in practice.

Please refer to FIG. 1, to apply said computer disk array to the industrial mainframe, the conventional hard disk cage 11 is disposed within a holding space 121 of a case 12, and a plurality of hard disk modules 111 are disposed within the hard disk cage 11 separately. The hard disk modules 111 are fixed within the case 12 on its both sides with one on top of another and capable of holding hard disks. The case 12 comprises a panel 122 and a side cover (not shown in the figure), the panel 122 is disposed at one end of the case 12 and covers the hard disk modules 111 to seal and fix the hard disks (not shown in the figure) within the hard disk modules 111, and the side cover is disposed at one side of the case 12 and steadily covers the corresponding side of the hard disk modules 111.

However, there is little room between the hard disk modules 111 and the holding space 121 when assembly which results in shaking during moving the case 12 and causes the hard disk modules 111 to come off the case 12. Besides, the design of piling the hard disk modules 111 within the case 12 on its both sides will occupy extra room of the holding space 121 which limits the amount of the hard disk modules 111 held within the hard disk cage 11. Hence, simplifying the structure of the hard disk modules 111 so as to save the holding space 121, hold more hard disks, and prevent the hard disk modules 111 from shaking has become an issue with great importance faced by each and every manufacturer.

SUMMARY OF THE INVENTION

For the purpose of solving the problems that with the conventional hard disk cage, there is clearance between the hard disk modules and the holding space which causes the hard disk modules to come off and limits the amount of the hard disk modules held within the hard disk cage, after hard work of research and experiments for a long time, the inventor has developed a slot assembly of hard disk tower of the present invention.

One of the objective of the present invention is to provide a slot assembly of hard disk tower, wherein the slot assembly is disposed at one end of the hard disk tower and comprises an upper slot assembly cover, a lower slot assembly cover and a circuit board. The upper slot assembly cover is disposed at the top of one end of the hard disk tower, and a plurality of upper directing slots are disposed in parallel on one side of the upper slot assembly cover. The lower slot assembly cover is disposed at the bottom of one end of the hard disk tower, and a plurality of lower directing slots are disposed in parallel on the side of the lower slot assembly cover facing the upper directing slots. Each lower directing slot corresponds to one of the upper directing slots and is capable of holding a hard disk tray. The circuit board is disposed between the same sides of said upper slot assembly cover and said lower slot assembly cover closing another end of said hard disk tower and comprises a plurality of hard disk connectors and light emitting devices, wherein each hard disk connector corresponds to a hard disk tray held between the upper directing slot and the lower directing slot and connects with the hard disk within the hard disk tray while each light emitting device corresponds to a light pipe disposed at the hard disk tray. Thus, through closely disposing the slot assembly covers at the top and bottom of the hard disk tower, the space within the hard disk tower will be fully utilized and is capable of holding more hard disk trays.

BRIEF DESCRIPTION OF THE DRAWINGS

The foregoing aspects, as well as many of the attendant advantages and features of this invention will become more apparent by reference to the following detailed description, when taken in conjunction with the accompanying drawings, wherein.

DETAILED DESCRIPTION OF THE PREFERRED EMBODIMENT

Figure 1:
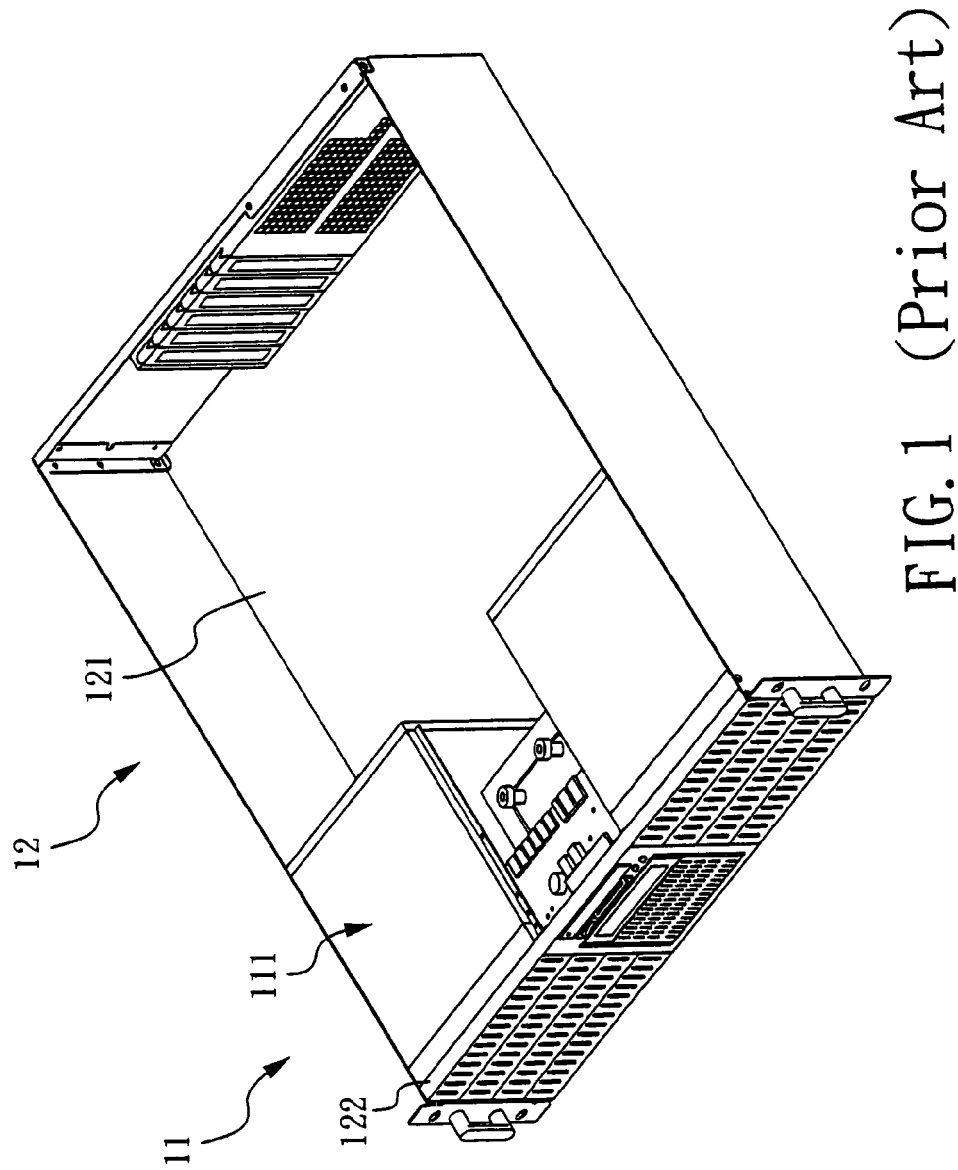
FIG. 1 shows the conventional hard disk cage.
Figure 2:
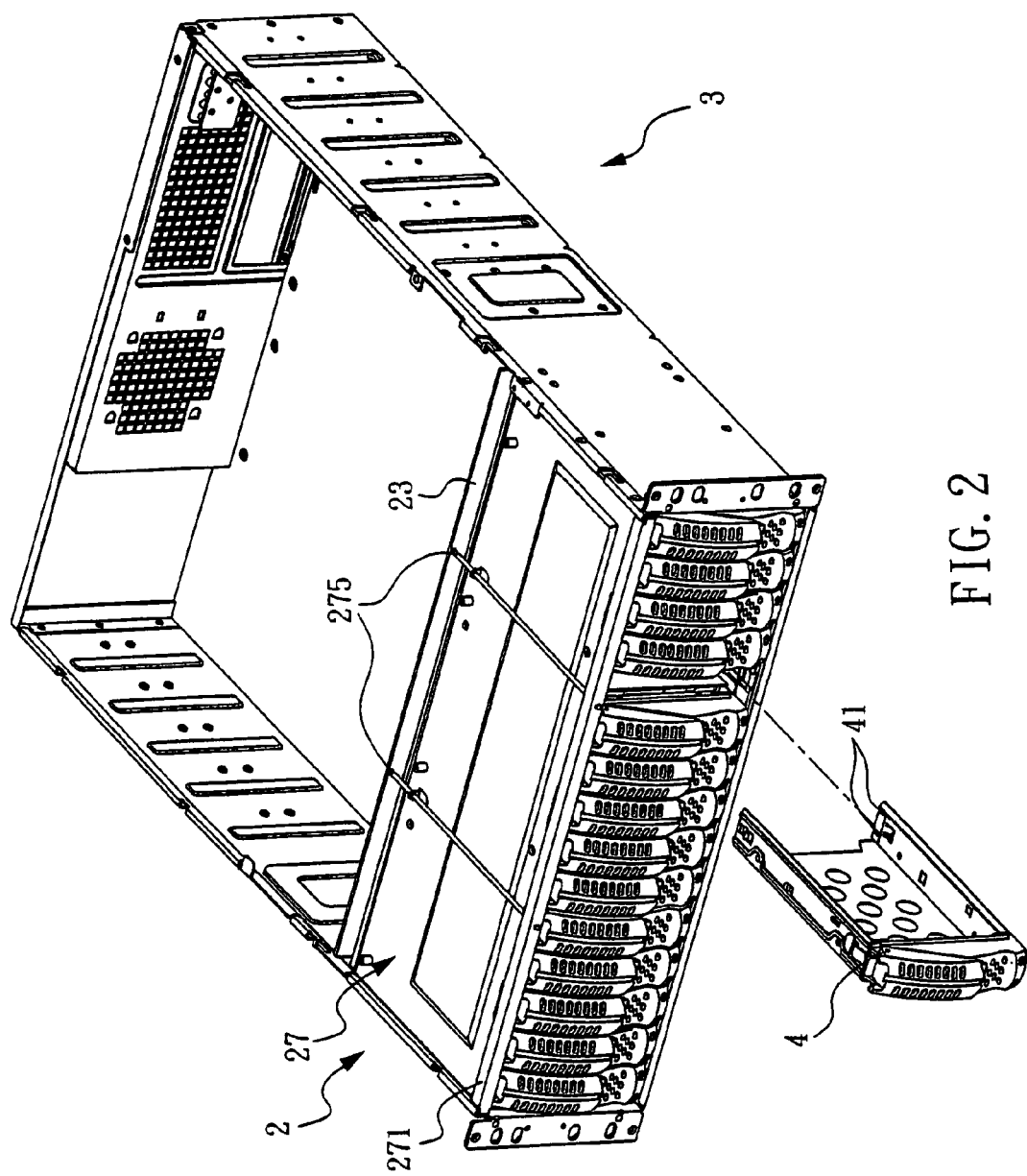
FIG. 2 shows the slot assembly of hard disk tower according to a preferred embodiment of the present invention.
Figure 3:
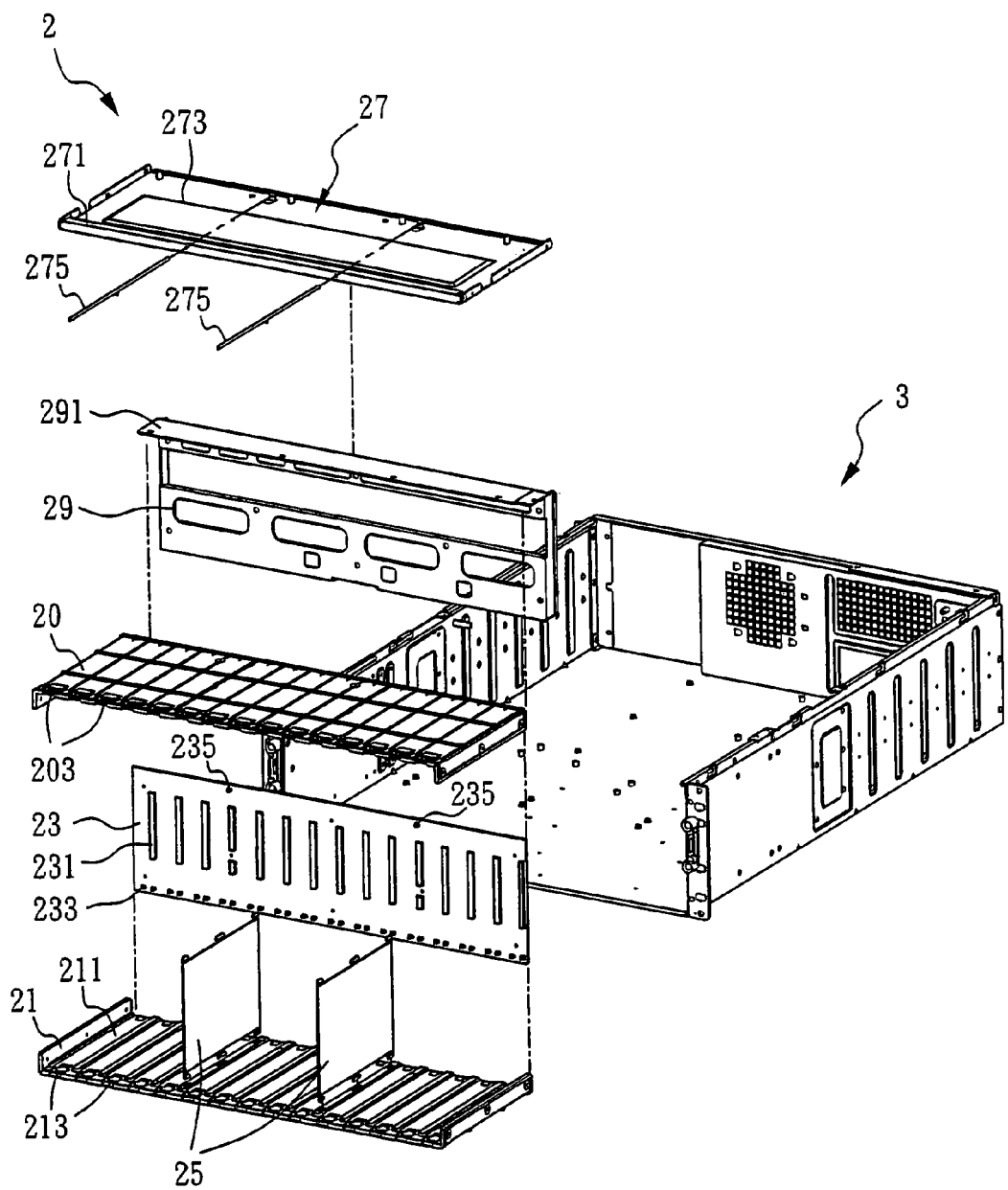
FIG. 3 is a decomposition diagram of the slot assembly of hard disk tower according to a preferred embodiment of the present invention.
Figure 4:
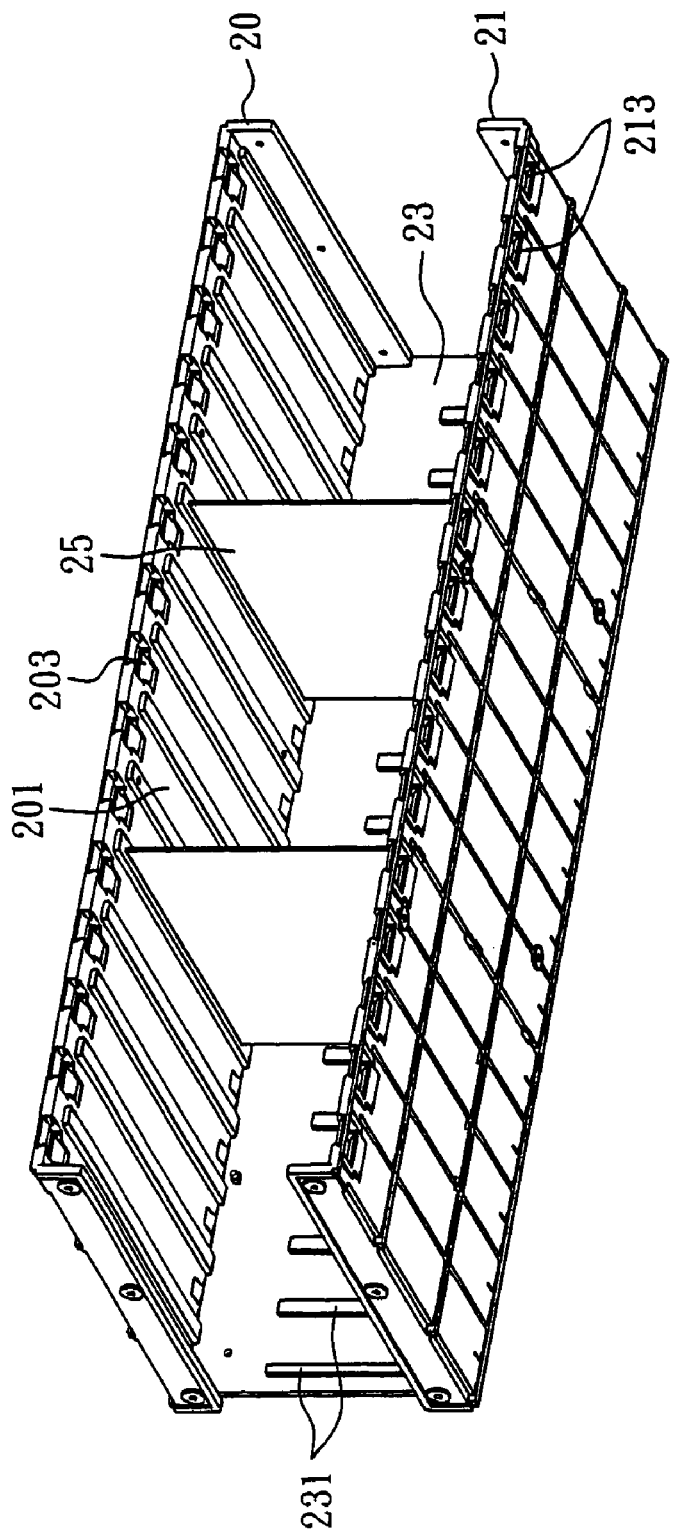
FIG. 4 shows part of the slot assembly of hard disk tower according to a preferred embodiment of the present invention.

Please refer to FIGS. 2 and 3, the present invention relates to a slot assembly of hard disk tower. The slot assembly 2 is disposed at one end of the hard disk tower 3 and comprises an upper slot assembly cover 20, a lower slot assembly cover 21 and a circuit board 23. The upper slot assembly cover 20 is disposed at the top of one end of the hard disk tower 3 while the lower slot assembly cover 21 is disposed at the bottom of one end of the hard disk tower 3 corresponding to the upper slot assembly cover 20. A plurality of upper directing slots 201 are disposed in parallel on one side of the upper slot assembly cover 20 (as shown in FIG. 4) while a plurality of lower directing slots 211 are disposed in parallel on the side of the lower slot assembly cover 21 facing the upper directing slots 201. Each lower directing slot 211 corresponds to one of the upper directing slots 201 and is capable of holding a hard disk tray 4 which enables a plurality of hard disk trays 4 to be held in parallel in the space between the upper slot assembly cover 20 and the lower slot assembly cover 21.

The circuit board 23 (such as an IC Printed Circuit Board, PCB) is disposed between the same sides of said upper slot assembly cover 20 and said lower slot assembly cover 21 closing another end of said hard disk tower 3, and a plurality of hard disk connectors 231 (such as Advanced Technology Attachment, ATA) and light emitting devices 233 (such as light emitting diode) are disposed on the side of the circuit board 23 facing the hard disk tray 4 and correspond to the upper directing slots 201 and the lower directing slot 211, wherein the hard disk connectors 231 electrically connect with the hard disks within the hard disk trays 4, and the light emitting devices 233 correspond to the light pipes 41 of the hard disk trays 4.

When inserted into the slot assembly 2 from one end of the hard disk tower 3, with the upper directing slots 201 and the lower directing slots 211, the hard disk trays 4 will be fixed in the slot assembly 2. And when the data stored in the hard disks is accessed by the circuit board 23, due to that the light emitting devices 233 are corresponding to the light pipes 41, the flashes generated by the light emitting devices 233 will be transmitted to one end of the hard disk tower 3 and exposed through the light pipes 41 so as to indicate the users that the data stored in the hard disks is received by the circuit board 23. Because the upper slot assembly cover 20 and the lower slot assembly cover 21 are disposed at the inner surface of the hard disk tower 3, the space of the hard disk tower 3 for holding the hard disk trays 4 will be fully utilized. Besides, the light emitting devices 233 faces the light pipes 41, so when the data stored in the hard disks is accessed by the circuit board 23, through the light pipes 41, the flashes generated by the light emitting devices 233 will be exposed outside of the hard disk tower 3 and easily observed.

Please refer to FIGS. 2 and 3, in one embodiment of the present invention, the slot assembly 2 further comprises at least a support board 25 disposed between the upper slot assembly cover 20 and the lower slot assembly cover 21 and parallel with the upper directing slots 201 and the lower directing slots 211, wherein one end of the support board 25 is coupled with the upper slot assembly cover 20 and the other end is coupled with the lower slot assembly cover 21. While the upper slot assembly cover 20, the lower slot assembly cover 21 and the circuit board 23 are disposed at one end of the hard disk tower 3, the structure of the slot assembly 2 may be reinforced through coupling the support board 25 with the upper slot assembly cover 20 and the lower slot assembly cover 21.

Please refer to FIGS. 2 to 4, in said embodiment, a plurality of limit slots 203 are disposed at the inner surface of the upper slot assembly cover 20 at the location of the end of the upper directing slot 201 near the hard disk tower 3 while a plurality of limit slots 213 are disposed at the inner surface of the lower slot assembly cover 21 at the location of the end of the lower directing slot 211 near the hard disk tower 3, wherein each limit slot 213 corresponds to one limit slot 203 and is utilized to engage with the hard disk tray 4 respectively. When the hard disk tray 4 is held within the upper directing slot 201 and lower directing slot 211 and connected with the hard disk connector 231, the limit slots 203 and 213 enable the hard disk tray 4 to be engaged with the slot assembly 2 steadily so as to prevent the hard disk tray 4 from slipping out of the slot assembly 2 and stabilize the data access of the hard disk tower 3 toward the hard disk.

Please refer to FIGS. 2 and 3, in said embodiment, the slot assembly 2 further comprises a loading board 27 disposed at the surface of the upper slot assembly cover 20 against the lower slot assembly cover 21. The loading board 27 comprises an extended edge 271 and at least a light guiding device 275, wherein the extended edge 271 is disposed at the edge of one end of the loading board 27, and together the extended edge 271 and the roof of the hard disk tower 3 form a holding space 273 in which the light guiding device 275 is held. One end of the light guiding device 275 faces the circuit board 23 while the other end passes through the extended edge 271 and extends to the end near the hard disk tower 3. Besides, the circuit board 23 further comprises a light emitting device 235 (such as a light emitting diode) disposed at the location corresponding to one end of the light guiding device 275 and faces one end of the light guiding device 275.

Via making the light emitting device 235 face the light guiding device 275, when the circuit board 23 is powered, the light emitting device 235 of the circuit board 23 generates flashes which are transmitted to one end of the hard disk tower 3 and exposed by the light guiding device 275. Thus, the loading board 27 fixed on the roof of the hard disk tower 3 will keep the structure of the slot assembly 2 from being easily damaged and substantially reinforce the structure of the slot assembly 2, enable the limited space of the slot assembly 2 to be fully utilized via holding the light guiding device 275 within the holding space 273, and make the flashes to be exposed outside of the hard disk tower 3 for easy observation through the light guiding device 275.

Please refer to FIGS. 2 and 3, in said embodiment, the slot assembly 2 further comprises a secure board 29 disposed at the surface of the circuit board 23 against the hard disk tower 3. The secure board 29 comprises another extended edge 291 disposed at the edge of the secure board 29 facing the hard disk tower 3 and held within the holding space 273. When there is a long-term connection between the hard disk and the hard disk connector 231, a sort of force capable of causing damage to the structure of the circuit board 23 will be generated. The secure board 29 may be utilized to secure the circuit board 23, eliminate said force and keep the structure of the circuit board 23 from being damaged. Moreover, disposing the another extended edge 291 over the holding space 273 enables the end of the light guiding device 275 to fully receive the flashes generated by the light emitting device 235.

While the invention herein disclosed has been described by means of specific embodiments, numerous modifications and variations could be made thereto by those skilled in the art without departing from the scope and spirit of the invention set forth in the claims.

What is claimed is:

1. A slot assembly of hard disk tower disposed at one end of said hard disk tower, comprising:

an upper slot assembly cover disposed at the top of one end of said hard disk tower, wherein a plurality of upper directing slots are disposed in parallel on one side of said upper slot assembly cover;

a lower slot assembly cover disposed at the bottom of one end of the hard disk tower, wherein a plurality of lower directing slots are disposed in parallel on the side of said lower slot assembly cover facing said upper directing slots, and each of said lower directing slot corresponds to one of said upper directing slots and is capable of holding a hard disk tray; and a circuit board disposed between the same sides of said upper slot assembly cover and said lower slot assembly cover closing another end of said hard disk tower, wherein said circuit board comprises a plurality of hard disk connectors and light emitting devices, and each hard disk connector corresponds to a hard disk tray held between said upper directing slot and said lower directing slot while each light emitting device faces a light pipe disposed at said hard disk tray.

2. A slot assembly of hard disk tower of claim 1, wherein said slot assembly further comprises at least a support board disposed between said upper slot assembly cover and said lower slot assembly cover and parallel with said directing slots.

3. A slot assembly of hard disk tower of claim 2, wherein said slot assembly further comprises a loading board disposed at the surface of said upper slot assembly cover against said lower slot assembly cover.

4. A slot assembly of hard disk tower of claim 3, wherein a limit slot is disposed at the inner surface of said upper slot assembly cover at the location of the end of each said upper directing slot near said hard disk tower.

5. A slot assembly of hard disk tower of claim 4, wherein another limit slot is disposed at the inner surface of said lower slot assembly cover at the location of the end of each said lower directing slot near said hard disk tower and corresponds to a limit slot respectively.

6. A slot assembly of hard disk tower of claim 5, wherein on the side of said loading board facing the roof of said hard disk tower, said loading board comprising:

an extended edge disposed at the edge of one end of said loading board for forming a holding space between the roof of said hard disk tower and said loading board; and at least a light guiding device, wherein one end of said light guiding device faces said circuit board while the other end passes through said extended edge and extends to the end near said hard disk tower.

7. A slot assembly of hard disk tower of claim 6, wherein said circuit board further comprises at least a light emitting device facing said light guiding device.

8. A slot assembly of hard disk tower of claim 7, wherein said slot assembly further comprises a secure board disposed at the surface of said circuit board against said hard disk tower, and said secure board comprises another extended edge disposed at the edge of said secure board facing the roof of said hard disk tower and held within said holding space.

9. A slot assembly of hard disk tower of claim 8, wherein said light emitting device is a light emitting diode.

10. A slot assembly of hard disk tower of claim 8, wherein said hard disk connector is an ATA connector.

* * * * *